(12) United States Patent
Eggler et al.

(10) Patent No.: US 12,285,712 B2
(45) Date of Patent: Apr. 29, 2025

(54) DUST COLLECTION DEVICE AND METHOD FOR FILTERING POWDER

(71) Applicant: Tetra Laval Holdings & Finance S.A., Pully (CH)

(72) Inventors: Thomas Eggler, Rothrist (CH); Denis Steffen, Gränichen (CH); Devis Gangale, Rupperswil (CH); Richard Chapman, Eastcote Towcester (GB)

(73) Assignee: Tetra Laval Holdings & Finance S.A., Pully (CH)

( * ) Notice: Subject to any disclaimer, the term of this patent is extended or adjusted under 35 U.S.C. 154(b) by 380 days.

(21) Appl. No.: 17/779,594

(22) PCT Filed: Nov. 25, 2020

(86) PCT No.: PCT/EP2020/083357
§ 371 (c)(1),
(2) Date: May 25, 2022

(87) PCT Pub. No.: WO2021/105206
PCT Pub. Date: Jun. 3, 2021

(65) Prior Publication Data
US 2023/0011697 A1    Jan. 12, 2023

(30) Foreign Application Priority Data
Nov. 28, 2019  (EP) .................................... 19211988

(51) Int. Cl.
*B01D 47/02* (2006.01)
*B01D 47/10* (2006.01)

(52) U.S. Cl.
CPC ........... *B01D 47/024* (2013.01); *B01D 47/10* (2013.01); *B01D 2247/04* (2013.01)

(58) Field of Classification Search
CPC ... B01D 47/024; B01D 47/10; B01D 2247/04
See application file for complete search history.

(56) References Cited

U.S. PATENT DOCUMENTS

| 6,391,100 B1 | 5/2002 | Hogan |
| 2009/0165685 A1* | 7/2009 | Chen ..................... B01D 47/06 110/216 |

(Continued)

FOREIGN PATENT DOCUMENTS

| FR | 2452311 A1 | 10/1980 |
| KR | 101227893 B1 | 1/2013 |
| WO | 2014208902 A1 | 12/2014 |

OTHER PUBLICATIONS

Extended European Search Report dated Jun. 19, 2020, for priority European Patent Application No. 19211988.1.

(Continued)

*Primary Examiner* — Dung H Bui
(74) *Attorney, Agent, or Firm* — Renner, Otto, Boisselle & Sklar, LLP (57) ABSTRACT

A dust collection device and method for filtering powder from powder-filled air in a food product processing system. The dust collection device includes a venturi mixer having an inlet for receiving powder-filled air, a liquid inlet for receiving liquid, and a nozzle. The nozzle is arranged to eject the liquid into a mixing zone of the venturi mixer. The powder-filled air and the liquid meet in the mixing zone to form a liquid mixture. The dust collection device includes a chamber that receives the liquid mixture from the mixing zone, a recirculation line that feeds the liquid mixture back to the liquid inlet of the venturi mixer, and an air outlet that discharges air from the chamber.

10 Claims, 5 Drawing Sheets

(56) References Cited

U.S. PATENT DOCUMENTS

2012/0097031 A1* 4/2012 McClelland .......... B01D 53/18
  261/115
2015/0004064 A1   1/2015 Lee

OTHER PUBLICATIONS

International Search Report mailed Jan. 29, 2021, for priority International Patent Application No. PCT/EP2020/083357.

* cited by examiner

DUST COLLECTION DEVICE AND METHOD FOR FILTERING POWDER

TECHNICAL FIELD

The invention relates to a device and method for filtering product powder from powder-filled air generated during powder handling in a food product processing system.

TECHNICAL BACKGROUND

Product powders may be used to produce various food products. Using product powders are advantageous in that the powder may be stored for long periods of time without being spoiled. The powder may also be easily dissolved in a liquid to form the desired product. Food products formed by powders may include dairy beverages, such as milk, non-dairy beverages, such as soft drinks, and other dairy products such as ice cream, yogurt, or cheese. Product powders may include raw materials such as sugar, milk powder, salt, or flour, or finished products such as instant formula, instant drinks, or dry broth. In producing a milk alternative that resembles fresh dairy milk, raw milk powder may be used. The raw milk powder dissolves easily in water to form a reconstituted liquid milk that undergoes further processing, including filtration, homogenization, and heat treatment, to form the final beverage product.

Handling product powders, for example when emptying the powder from bags into a mixing system in which liquid or other ingredients are added, commonly results in that a lot of product powder dust is created. Conventional food product processing systems are configured to collect some of the product powder dust, but the conventional system are deficient in being able to efficiently recover the product powder into the product. Thus, product powder is wasted and the resulting food products may have recipe inaccuracies due to the lost powder.

SUMMARY

It is an object of the invention to at least partly overcome one or more limitations of the prior art. In particular, it is an object to provide a device and method that filters product powder from powder-filled air.

According to an aspect of the invention, a dust collection device is used to filter powder from powder-filled air that is drawn from a food product processing system. The dust collection device includes a venturi mixer that has an inlet for receiving the powder-filled air, a liquid inlet for receiving a liquid, and a nozzle. The dust collection device further includes a housing that surrounds the venturi mixer and defines a mixing zone. The nozzle is arranged to eject the liquid into the mixing zone and to create a vacuum when the liquid passes though the nozzle, such that the powder-filled air is drawn into the mixing zone where the powder-filled air and the liquid meet to form a liquid mixture of the liquid and the powder from the powder-filled air. The recirculation line includes a chamber arranged in the dust collection device to receive the liquid mixture from the mixing zone, a recirculation line arranged to draw the liquid mixture from the chamber and feed the liquid mixture to the liquid inlet of the venturi mixer, and an air exit port arranged to discharge air from the chamber.

Accordingly, the "filtering" according to the invention is not done in the traditional way, i.e. by using a membrane or a web to trap the powder. Instead, the powder is filtered from the air by using the mixing to trap the powder in the liquid.

The dust collection device described herein is advantageous in that the device filters the product powder out of the air in a very efficient and sanitary manner. The device includes the venturi mixer to mix the liquid with the product powder, which reduces the risk of dust explosion. The recirculation line is used to recirculate the liquid mixture back to the liquid inlet of the venturi mixer. The clean air from which the powder is filtered is discharged from the dust collection device. The liquid mixture may in one embodiment be returned to a main mixing tank. Such main mixing tank typically holds a mixture of the same type of liquid and powder that was ejected respectively drawn into the mixing zone of the dust collection device. Returning the liquid mixture in this way is advantageous in that product powder can be recovered.

According to another aspect of the invention, a method for collecting powder from powder-filled air is used for powder-filled air that is drawn from a food product processing system. The method includes receiving the powder-filled air in an inlet of a venturi mixer, receiving a liquid in a liquid inlet of the venturi mixer, and ejecting the liquid into a mixing zone of a housing surrounding the venturi mixer using a nozzle of the venturi mixer to create a vacuum when the liquid passes though the nozzle, such that the powder-filled air is drawn into the mixing zone where the powder-filled air and the liquid meet to form a liquid mixture of the liquid and the powder from the powder-filled air. The method includes receiving the liquid mixture from the mixing zone in a chamber, drawing the liquid mixture from the chamber, feeding the liquid mixture to the liquid inlet of the venturi mixer, and discharging air from the chamber.

This method may include the same features as the dust collection device and shares the same advantages.

Still other objectives, features, aspects and advantages of the invention will appear from the following detailed description as well as from the drawings.

BRIEF DESCRIPTION OF THE DRAWINGS

Features of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
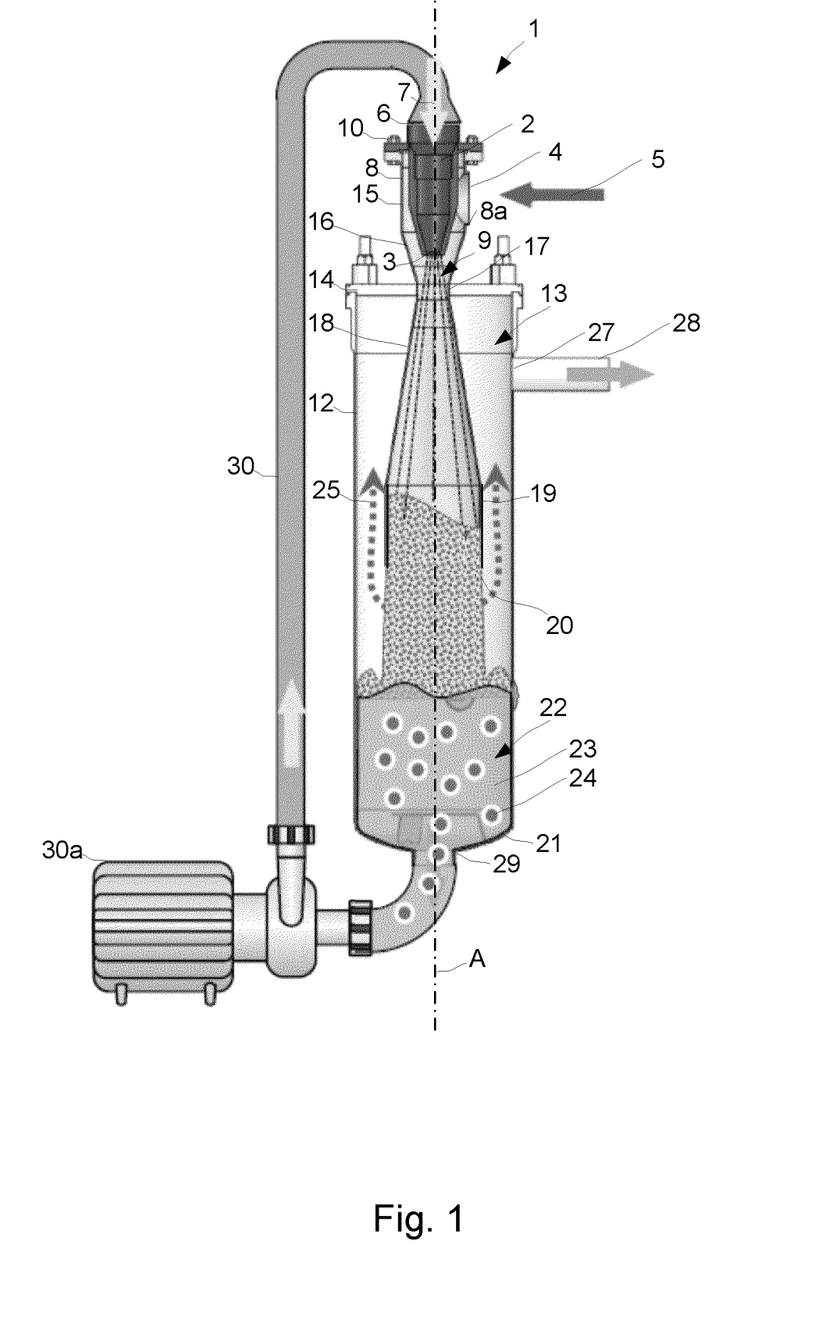
FIG. 1 is a sectional view of a dust collection device for filtering powder from powder-filled air that is drawn from a food product processing system.

Referring first to FIG. 1, a dust collection device 1 for a food product processing system is shown. The dust collection device 1 may be arranged as part of the food product processing system and may be located downstream of a powder handling unit of the food product processing system for receiving product powder-filled air from the powder handling unit. The dust collection device 1 includes a venturi mixer 2 having a nozzle 3, a port or inlet 4 for receiving a flow 5 of the powder-filled air, and a liquid port or inlet 6 for receiving a flow 7 of liquid, such as water or milk, to be mixed with the product powder.

The food product produced by the food product processing system may be a beverage product, such as a dairy beverage or a non-dairy beverage. The beverage product may include milk or soft drinks. The food product may include other non-beverage food products such as ice cream, yogurt, or cheese. Any food product formed by processing a product powder material may be suitable. The product powder may include any suitable ingredient to form the desired product. The product powder may include raw materials such as sugar, milk powder salt, or flour, or finished product such as instant formula, instant drinks, or dry broth. Other product powders may be suitable. The liquid and the product powder used in the dust collection device 1 are dependent on the food product being produced by the food product processing system. The food product processing system the dust collection device 1 is part of must not necessarily produce a food product. For example, the food processing may comprise or consist of handling, transporting or packaging powder that may be used in food processing. The dust collection device can then be used for filtering powder-filled air that emanates from the handling, transporting or packaging of the powder.

The venturi mixer 2 includes a housing 8 that defines a mixing zone 9 arranged downstream of the nozzle 3. The housing 8 radially surrounds the nozzle 3 and may be secured to the liquid inlet 6. The liquid inlet 6, the nozzle 3, and the housing 8 may axially extend along a common central axis A of the dust collection device 1. The liquid inlet 6 and the nozzle 3 may be formed separately relative to the housing 8 and secured to the housing 8 using any suitable fasteners, such as bolts 10. The inlet 4 may be formed on the housing 8 or as part of the housing 8. The inlet 4 may be arranged substantially perpendicular to the liquid inlet 6. The housing 8 may define a radial space 8a that surrounds the nozzle 3 and is fluidly connected between the inlet 4 and the mixing zone 9. The flow 5 of powder-filled air travels through the radial space 8a past the nozzle 3 toward the mixing zone 9 formed below the nozzle 3.

The nozzle 3 is arranged to eject the flow 7 of liquid into the mixing zone 9. The flow of liquid creates a venturi effect and a vacuum is thereby generated in the mixing zone 9 to draw the flow 5 of powder-filled air through the radial space 8a of the housing 8 and into the mixing zone 9. Using the venturi mixer 2 generate a large flow of the powder-filled air into the venturi mixer 2. The flow 7 of the liquid and the flow 5 of the powder-filled air meet in the mixing zone 9 to mix and form a liquid mixture of the liquid and the powder from the powder-filled air. In other words, in the mixing zone 9 the powder in the powder-filled air comes into contact with the liquid, resulting in that the powder becomes trapped in the liquid. The resulting liquid mixture may be the desired food product or may be a liquid mixture configured for further downstream mixing to produce the desired beverage product.

The dust collection device 1 includes an enclosed tank or vessel 12 that is secured to the venturi mixer 2. The vessel 12 is arranged downstream from the nozzle 3 to receive the liquid mixture and the air from which the powder is filtered. The vessel 12 may be cylindrical in shape and defines a chamber 13 in which the housing 8 and the mixing zone 9 is at least partly contained. The housing 8 of the venturi mixer 2 extends into the chamber 13 through a cover plate 14 of the vessel 12. The dust collection device 1 may be oriented vertically such that the vessel 12 is arranged below the venturi mixer 2. The flow 7 of liquid may travel downwardly through the dust collection device 1 toward a bottom of the vessel 12. The vessel 12 may also extend along the common central axis A of the venturi mixer 2. The vessel 12 may be sized to contain a predetermined volume of the liquid mixture which is dependent on the application.

The housing 8 includes a first cylindrical section 15 that has a constant outer diameter and is bolted to the liquid inlet 6. The first cylindrical section 15 may define the inlet 4 and the radial space 8a defined between the nozzle 3 and the inlet 4. A tapering section 16 of the housing 8 has an outer diameter that tapers radially inwardly from the first cylindrical section 15 to a bottleneck section 17 of the housing 8. The nozzle 3 may be arranged in the tapering section 16. The mixing zone 9 extends from the tapering section 16 into the bottleneck section 17. The bottleneck section 17 may be supported in the cover plate 14 of the vessel 12 to position the venturi mixer 2 relative to the vessel 12. The bottleneck section 17 of the housing 8 may be press-fit into a corresponding recess of the cover plate 14.

A widening diffuser section 18 extends from the bottleneck section 17 to a cylindrical diffuser section 19 of the housing 8 that disperses the liquid mixture and the clean air. Both the widening diffuser section 18 and the cylindrical diffuser section 19 are arranged within the chamber 13. The widening diffuser section 18 extends through the chamber 13, or downwardly into the chamber 13, and may gradually widen by an angle $\alpha$ (see FIG. 2) that is between 15 and 40 degrees. The outer diameter of the widening diffuser section 18 extends radially outwardly to the cylindrical diffuser section 19. The outer diameter of the cylindrical diffuser section 19 may be an outermost diameter of the housing 8. The widening diffuser section 18 has an axial length that is greater than a length of the first cylindrical section 15, the tapering section 16, the bottleneck section 17, and the cylindrical diffuser section 19. The widening diffuser section 18 may have an axial length that is at least two times greater than the length of the cylindrical diffuser section 19. All of the sections of the housing 8 may be formed integrally such that the housing 8 of the venturi mixer 2 is a single and continuous part.

The cylindrical diffuser section 19 has an end face 20 that is arranged at an axial position within the chamber 13. The end face 20 may be spaced from a bottom end 21 of the vessel 12 which is distally opposite the cover plate 14 to define a collecting area 22 at the bottom end 21 of the vessel 12. The widening diffuser section 18 and the cylindrical diffuser section 19 form a diffusing portion of the housing 8 that is configured to disperse a liquid mixture 23 formed of the liquid and particles of product powder 24 that is filtered from the powder-filled air. Forming the liquid mixture 23 is advantageous in that drawing the powder into the water enables the powder to be less explosive during processing.

When the powder has been trapped by the liquid, then the air becomes "clean air" in the sense that most if not all powder is removed from the air. The clean air 25 may escape and travel upwardly through the chamber 13 away from the liquid mixture 23. An air exit port or outlet 27 is formed on the vessel 12 to discharge the clean air 25. The clean air 25 may pass over the widening diffuser section 18 within the chamber 13 toward the air outlet 27. The air outlet 27 is arranged on an upper end of the vessel 12 and may be formed adjacent the widening diffuser section 18 of the housing 8. A fluid line 28 may be fluidly connected to the air outlet 27 for transferring the clean air 25 back to a main mixing tank of the food product processing system. Alternatively, the clean air is released in the surrounding atmosphere and/or is passed through a conventional filter to trap any powder that might remain in the air.

The liquid mixture 23 is collected in the collecting area 22 of the vessel 12 after being dispersed by the cylindrical diffuser section 19 of the housing 8. The liquid mixture 23 may collect at the bottom end 21 of the vessel 12 by gravity. A liquid mixture return port or outlet 29 is formed in the bottom end 21 of the vessel 12 and a recirculation line 30 is fluidly connected to the liquid mixture outlet 29. The recirculation line 30 is fluidly connected between the liquid mixture outlet 29 of the vessel 12 and the liquid inlet 6 of the venturi mixer 2 for recirculating the liquid or the liquid mixture 23. The recirculation line 30 may extend along an entire length of the vessel 12 and is configured to draw the liquid mixture 23 from the chamber 13.

A recirculation unit 30a is arranged along the recirculation line 30. The recirculation unit 30a includes a suction pump that sucks the liquid mixture 23 from the chamber 13 and pumps the liquid mixture 23 to the liquid inlet 6 of the venturi mixer 2. The recirculation unit 30a may pump the liquid mixture 23 upwardly from the bottom end 21 of the vessel 12. Accordingly, the dust collection device 1 is configured to intake the powder-filled air from the powder handling unit, filter the powder to form the liquid mixture of the powder and the liquid, and recirculate the liquid mixture. Thus, the dust collection device 1 enables re-using the filtered powder and ensures that the product powder is not wasted, in contrast to conventional food product processing systems in which powder is filtered from air.

Figure 2:
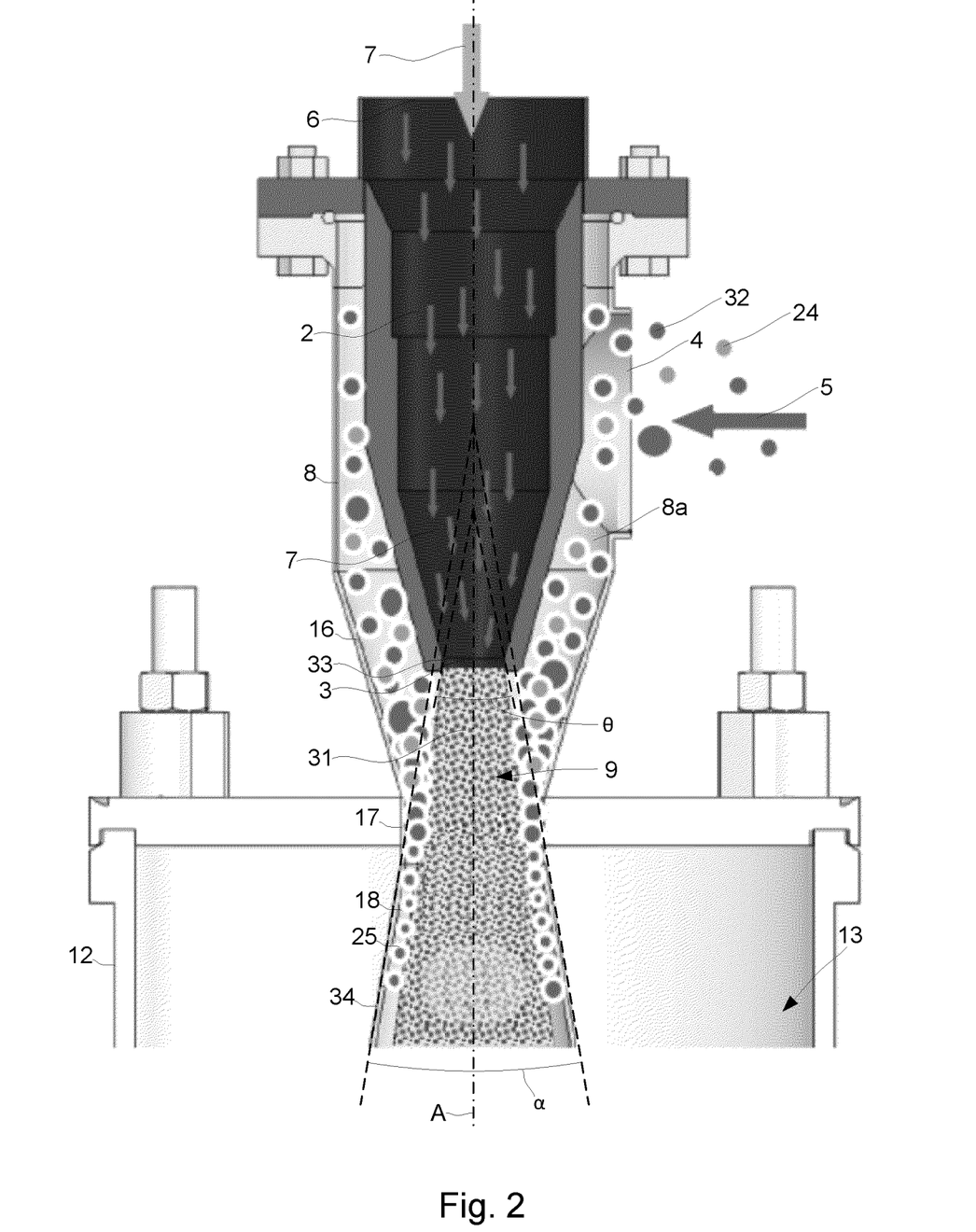
FIG. 2 is a detailed sectional view of a venturi mixer in the dust collection device of FIG. 1.

FIG. 2 shows a detailed sectional view of the venturi mixer 2. The nozzle 3 of the venturi mixer 2 has a full cone shape, i.e. the nozzle 3 is a full-cone nozzle, and is thus configured to output a full cone spray pattern 31 using the flow 7 of liquid from the liquid inlet 6. The nozzle 3 is configured downwardly toward the chamber 13 of the vessel 12. Other spray patterns may be suitable and the spray pattern may be dependent on the application. The nozzle 3 may have a plurality of outlets that provide jet streams to form the full cone spray pattern 31 of the liquid. Each outlet may have a diameter that is between 10 and 15 millimeters, or may have any other suitable diameter, and the plurality of outlets may be arranged in ordered pattern. The nozzle 3 is arranged upstream the mixing zone 9 and the flow 7 of liquid through the nozzle 3 creates the vacuum to draw the flow 5 of powder-filled air from the inlet 4 through the radial space 8a of the housing 8 into the mixing zone 9. The flow 7 of liquid is mixed with the powder-filled air containing air or gas 32 and the particles of product powder 24. The flow 5 of powder-filled air that is received from the powder handling unit may be formed of greater than 95% air and less than 5% powder. The flow 5 may be formed of approximately 99% air and 1% powder.

The full cone shape of the nozzle 3 has a widening orifice 33 that provides a spray angle $\theta$ that is between 15 and 45 degrees. The full cone spray pattern 31 thus widens by a similar angle that is between 15 and 45 degrees. The full cone spray pattern 31 extends along an entire length of the widening diffuser section 18 of the housing 8. The full cone spray pattern 31 may start at the nozzle 3 at an axial position defined within the tapering section 16 of the housing 8. The full cone spray pattern 31 gradually widen from the tapering section 16 through the bottleneck section 17 and through the widening diffuser section 18. The widening diffuser section 18 may widen relative to the bottleneck section 11 by an angle $\alpha$ that is less than the angle $\theta$ of the full cone shape of the nozzle 3. This reduces the risk of powder filled air escaping contact with the liquid. The angles $\alpha$ and $\theta$ may be within 10 degrees of each other.

The widening of the full cone spray pattern 31 through the tapering section 16 and the bottleneck section 11 forces the powder particles 24 to come into contact with the liquid. The clean air 25 is collected between the full cone spray pattern 31 and an outer wall 34 of the widening diffuser section 18.

Figure 3:
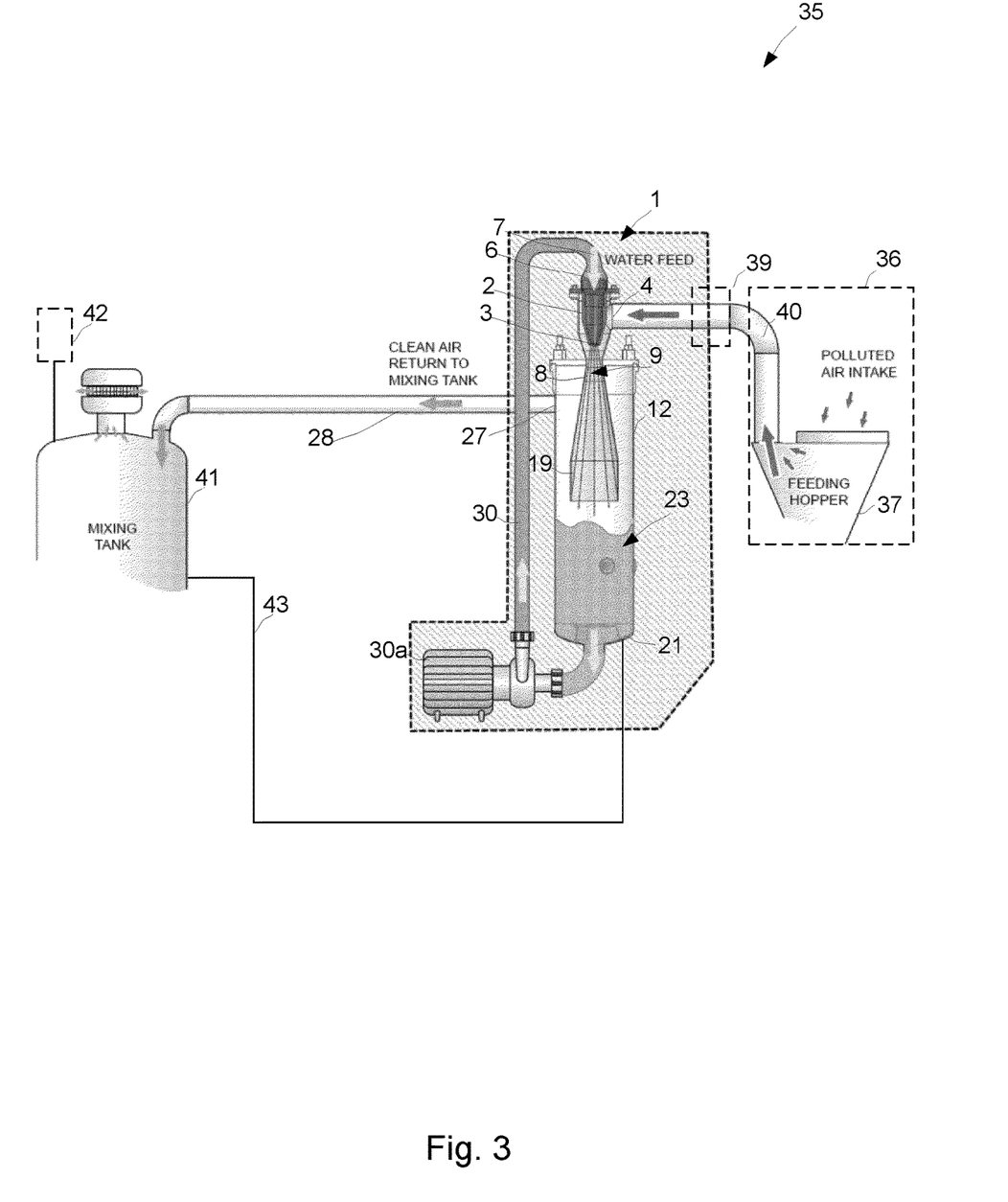
FIG. 3 is a schematic drawing of a food product processing system including the dust collection device of FIG. 1.

Referring now to FIG. 3, the dust collection device 1 is arranged as part of a food product processing system 35 that includes a powder handling unit 36. Bags of the product power may be emptied in the powder handling unit 36. The food product processing system 35 may be automated. Using the dust collection device 1 may contribute to the automation by enabling the powder-filled air to be constantly filtered by the dust collection device 1. The powder handling unit 36 includes in the illustrated embodiment a feeding hopper 37 that receives the powder. When the powder is received some of it is typically stirred up so that the surrounding air becomes powder-filled. This applies for air inside the hopper 37 as well as for air that surrounds the intake of the hopper 37.

The powder handling unit 36 has a fluid line 40 that is fluidly connected between the powder handling unit 36 and the inlet 4 of the dust collection device 1. The venturi effect in the dust collection device 1 creates suction that draws powder-filled air from the powder handling unit 36, much like a vacuum cleaner. Optionally, the fluid line 40 comprises a pump 39 for pumping powder-filled air from the powder handling unit 36 and onto the inlet 4 of the dust collection device 1, thereby increasing the suction effect.

The powder-filled air meets the flow 7 of liquid from the nozzle 3 in the mixing zone 9 of the venturi mixer 2 to form the liquid mixture 23. The liquid mixture 23 and the clean air is dispersed by the cylindrical diffuser section 19 of the housing 8 into the vessel 12. The clean air travels upwardly in the vessel 12 toward the air outlet 27 and the fluid line 28 to be discharged from the vessel 12. The fluid line 28 may be fluidly connected between the air outlet 27 and a main mixing tank 41 of the food product processing system 35 where the powder and a liquid is fed to be mixed. The main mixing tank 41 may be configured to receive ingredients from an ingredient feeding unit 42 that is fluidly connected to the main mixing tank 41. The ingredient received by the mixing tank 41 may be of the same type as the powder handled but the powder handling unit 36. The ingredient feeding unit 42 may, for example, be the powder handling unit 36, which then feeds the powder to the mixing tank 41. The ingredient feeding unit 42 may also be a conventional powder inlet of the mixing tank 41, which is then used to feed the mixing tank 41 with ingredients. Ingredients may include liquids or powders including raw powders or finished products. Typically, ingredient received by the mixing tank 41 has a powder form and is mixed with a liquid, such as water, vegetable oil, a liquid diary product or another liquid food ingredient. The mixing tank 41 may have a dedicated inlet for liquids. In some embodiments liquids may be introduced into the mixing tank 41 via the ingredient feeding unit 42. The main mixing tank 41 has a capacity that is at least twice as large as the capacity of the vessel 12 in which the liquid mixture 23 is collected.

The food product processing system 35 may further include a fluid line 43 that is fluidly connected between the bottom end 21 of the vessel 12 and the main mixing tank 41. Advantageously, the liquid mixture 23 may be routed downstream to the main mixing tank 41 via the fluid line 43. The liquid mixture 23 may be mixed with the ingredients in the main mixing tank 41 to form a main mixture that constitutes the desired food product. The fluid line 43 may include any suitable pump or suction nozzle for drawing the liquid mixture 23 from the vessel 12. The liquid mixture 23 is during operation of the dust collection device 1 recirculated to the liquid inlet 6 of the venturi mixer 2 via the recirculation line 30 and the recirculation unit 30a.

Figure 4:
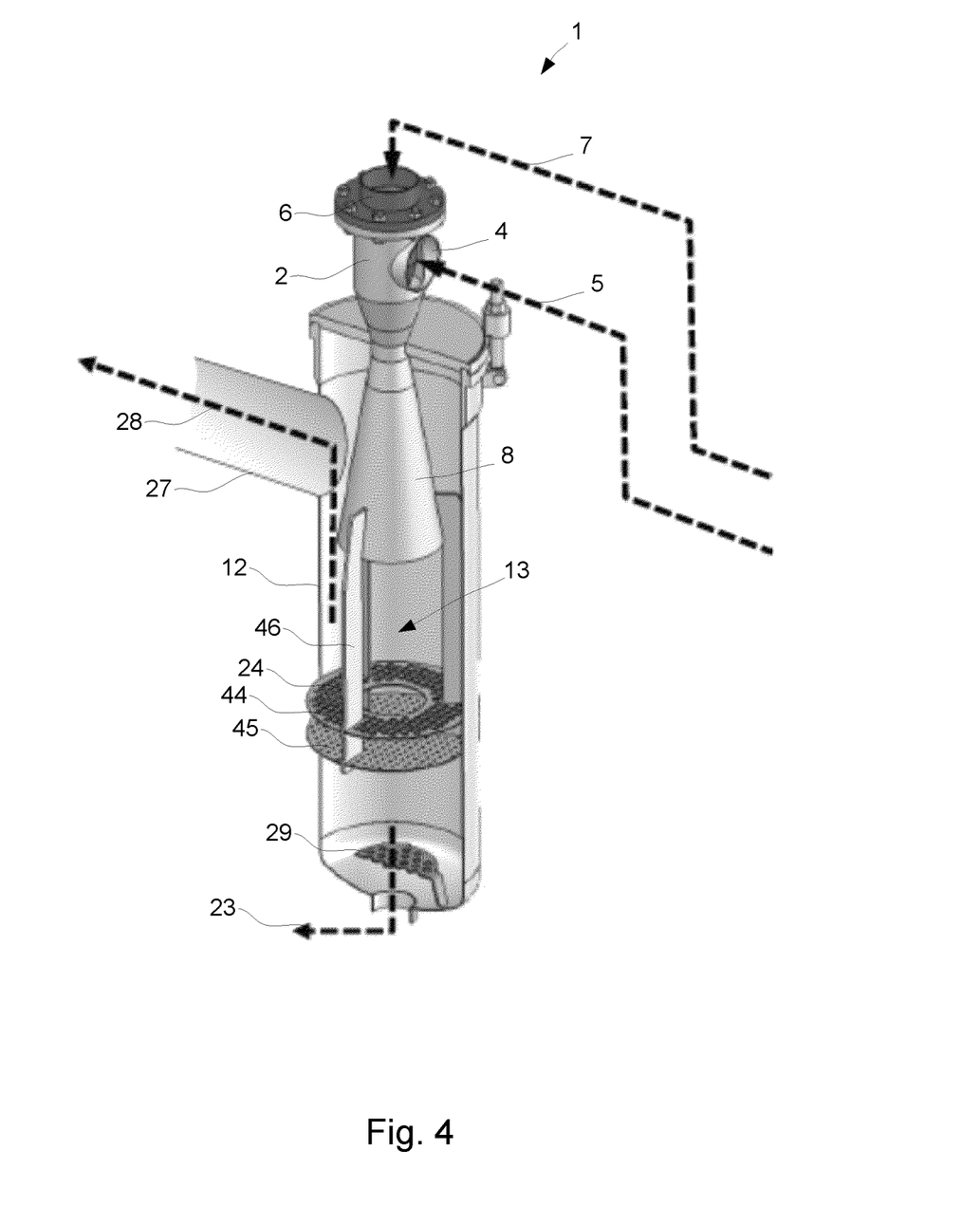
FIG. 4 is a perspective sectional view of the dust collection device of FIG. 1 having a mesh filter.

Referring now to FIG. 4, the dust collection device 1 may include at least one mesh filter 44 arranged in the vessel 12. The mesh filter 44 is arranged downstream of the mixing zone and located at an axial position between the venturi mixer 2 and the liquid mixture outlet 29. The dust collection device 1 includes the inlet 4 for receiving the flow 5 of the powder-filled air, the liquid inlet 6 for receiving the flow 7 of the liquid, the liquid mixture outlet 29 for recirculating the liquid mixture to the liquid inlet 6 or returning the liquid mixture 23 to the main mixing tank, and the air outlet 27 for returning the clean air 2 to the main mixing tank. Large particles or large undissolved particles of the powder 24 may be prevented from entering the recirculation line 30 by using the mesh filter 44. The mesh filter 44 may be disk-shaped or ring-shaped. The mesh filter 44 has an outer diameter that is complementary to the inner diameter of the vessel 12.

More than one mesh filter may be provided. Two mesh filters 44, 45 may be axially spaced within the vessel 12. The mesh filters 44, 45 may be mounted to the housing 8 of the venturi mixer 2. Any number of filters may be used and the meshing of the filters may be sized dependent on the beverage product and the size of the particles to be filtered. The mesh filters 44, 45 may be removable relative to the vessel 12. A supporting bracket 46 may axially extend from the housing 8 of the venturi mixer 2 through the mesh filters 44, 45.

Figure 5:
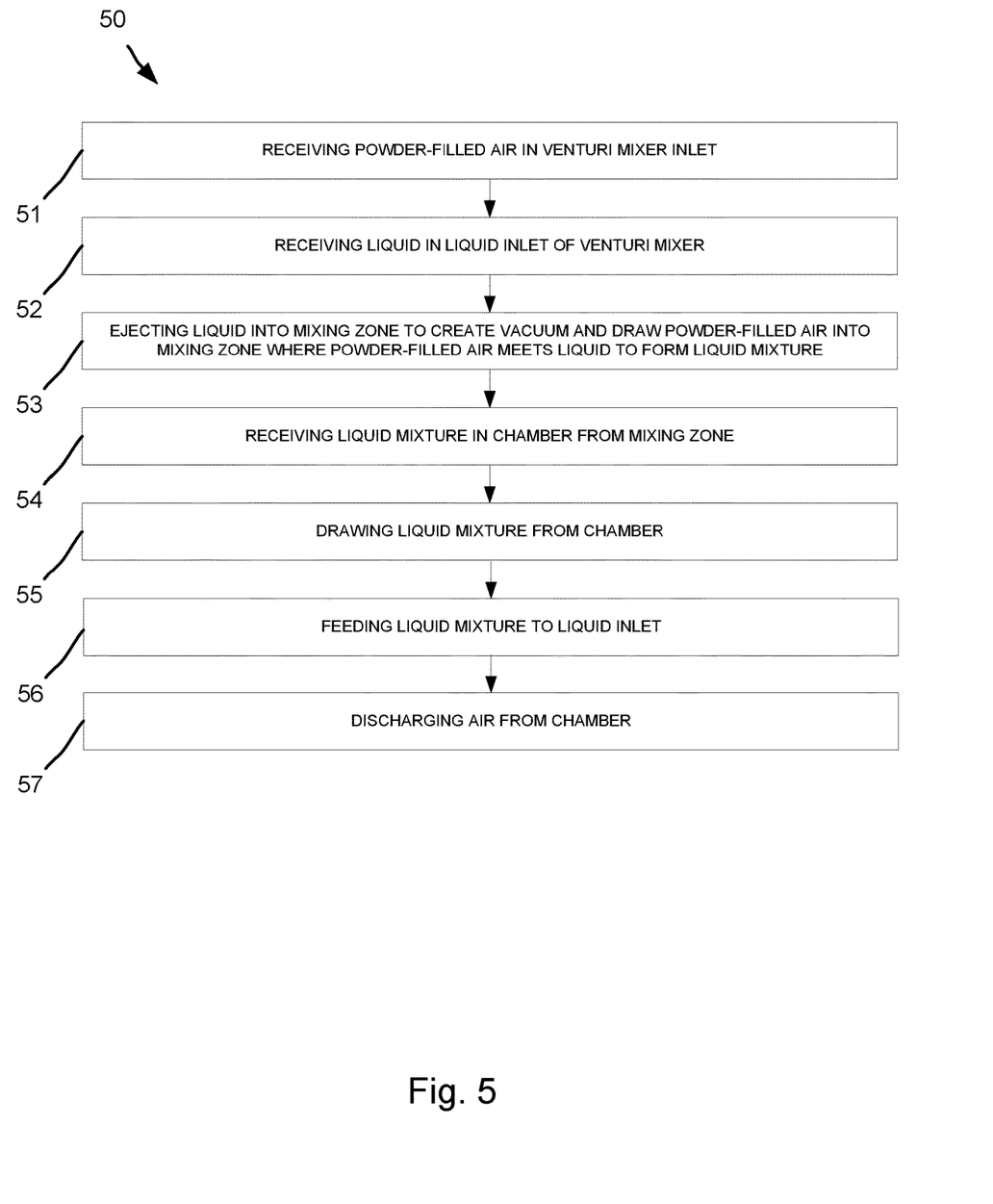
FIG. 5 is a flow chart of a method for filtering powder from powder-filled air using the food product processing system including the dust collection device of FIG. 1.

Referring now to FIG. 5, a method 50 for filtering powder from powder-filled air that is drawn from a food product processing system is shown. The food product processing system 35 of FIG. 3 including the dust collection device 1 shown in FIGS. 1-3 may be used to perform the method. The method 50 includes a step 51 of receiving the flow 5 of powder-filled air in the inlet 4 of the venturi mixer 2, as shown in FIG. 1. Step 51 may include receiving powder-filled air that formed of greater than 95% air and less than 5% powder, such as approximately 99% air and 1% powder. Step 52 of the method 50 includes receiving the flow 7 of liquid in the liquid inlet 6 of the venturi mixer 2, as shown in FIG. 1. Step 53 of the method 50 includes ejecting the flow 7 of liquid into the mixing zone 9 of the housing 8 of the venturi mixer 2 using the nozzle 3 of the venturi mixer 2, as shown in FIG. 1. The flow of liquid through the nozzle 3 creates a vacuum such that the flow 5 of powder-filled air is drawn into the mixing zone 9 where the powder-filled air and the liquid meet to form the liquid mixture 23 of the liquid and the powder from the powder-filled air.

Step 54 of the method 50 includes receiving the liquid mixture 23 in the chamber 13 of the vessel 12 from the mixing zone 9, as shown in FIG. 1. Step 55 includes drawing the liquid mixture from the chamber 13, such as by using the recirculation unit 30a shown in FIG. 1. Step 56 includes feeding the liquid mixture 23 back to the liquid inlet 6 of the venturi mixer 2 via the recirculation line 30 fluidly connected between the liquid mixture outlet 29 and the liquid inlet 6. Step 57 includes discharging the clean air from the chamber 13. In a final step the liquid mixture 23 may be transferred from the chamber 13 to the main mixing tank 41 of the food product processing system 35.

The food product processing system 35 including the dust collection device 1 is advantageous in recovering the product powder. The dust collection device 1 captures the powder-filled air from the powder handling unit, filters out the product powder, and mixes the product powder with a suitable liquid. The product powder may be recovered by recirculating the liquid mixture through the dust collection device 1 and finally by routing the liquid mixture back to the main mixing unit for mixing with additional ingredients to form the desired beverage product. In addition to decreasing the amount of powder lost during powder handling, using the dust collection device 1 advantageously reduces maintenance for the powder handling unit.

From the description above follows that, although various embodiments of the invention have been described and shown, the invention is not restricted thereto, but may also be embodied in other ways within the scope of the subject-matter defined in the following claims.

The invention claimed is:

1. A food product processing system comprising:
   a dust collection device for filtering powder from powder-filled air that is drawn from a food product processing system, the dust collection device comprising:
      a venturi mixer that has an inlet for receiving the powder-filled air, a liquid inlet for receiving a liquid, a nozzle, and a housing that defines a mixing zone, wherein the nozzle is arranged to eject the liquid into the mixing zone and to create a vacuum when the liquid passes though the nozzle, such that the powder-filled air is drawn into the mixing zone where the powder-filled air and the liquid meet to form a liquid mixture of the liquid and the powder from the powder-filled air, and
      a chamber arranged to receive the liquid mixture from the mixing zone, wherein the dust collection device further comprises:
         a recirculation line arranged to draw the liquid mixture from the chamber and feed the liquid mixture to the liquid inlet of the venturi mixer, and
         an air outlet arranged to discharge air from the chamber,
   a powder handling unit connected to the dust collection device, for allowing powder-filled air to be conveyed from the powder handling unit to the dust collection device,
   an ingredient feeding unit configured to receive and feed an ingredient; and
   a mixing unit fluidly connected to the ingredient feeding unit and configured to mix the ingredient with a liquid, wherein
   a fluid line is connected between the chamber of the dust collection device and the mixing unit, for allowing transportation of the liquid mixture from the chamber to the mixing unit.

2. The food product processing system according to claim 1, wherein the nozzle is a full-cone nozzle that is configured to provide a cone-shaped spray pattern.

3. The food product processing system according to claim 2, wherein the cone-shaped spray pattern has a spray angle that is between 15 and 45 degrees.

4. The food product processing system according to claim 3, wherein the housing includes a widening diffuser section that at least partly defines the mixing zone and widens by an angle.

5. The food product processing system according to claim 4, wherein the widening diffuser section widens by an angle that is less than the spray angle of the spray pattern.

6. The food product processing system according to claim 4, wherein the housing includes a cylindrical diffuser section that at least partly defines the mixing zone and is arranged downstream relative to the widening diffuser section.

7. The food product processing system according to claim 1, wherein the chamber has a liquid mixture outlet.

8. The food product processing system according to claim 7, comprising a mesh filter arranged in the chamber between the mixing zone and the liquid mixture outlet.

9. A method for collecting powder from powder-filled air that is drawn from the food product processing system according to claim 1, the method comprising:
   receiving the powder-filled air in the inlet of the venturi mixer of the dust collection device;
   receiving a liquid in the liquid inlet of the venturi mixer;
   ejecting the liquid into the mixing zone of the venturi mixer using the nozzle of the venturi mixer to create a vacuum when the liquid passes though the nozzle, such that the powder-filled air is drawn into the mixing zone where the powder-filled air and the liquid meet to form a liquid mixture of the liquid and the powder from the powder-filled air;
   receiving the liquid mixture in the chamber of the dust collection device from the mixing zone;
   drawing the liquid mixture from the chamber;
   feeding the liquid mixture to the liquid inlet of the venturi mixer;
   discharging air from the chamber; and
   returning the liquid mixture to the mixing unit of the food product processing system.

10. The method according to claim 9, wherein the powder-filled air comprises more than 95% air and less than 5% powder.

* * * * *